United States Patent [19]
Graef

[11] 3,860,333
[45] Jan. 14, 1975

[54] MICROFICHE READER
[75] Inventor: John N. Graef, West Bend, Wis.
[73] Assignee: Realist, Inc., Menomonee Falls, Wis.
[22] Filed: Mar. 20, 1972
[21] Appl. No.: 236,493

[52] U.S. Cl................. 353/24, 353/27, 353/99, 353/64
[51] Int. Cl.............................................. G03b 21/14
[58] Field of Search............ 353/24, 39, 40, 72, 87, 353/99, 27, 78, 51, 64, 66, 73, 76, 67

[56] References Cited
UNITED STATES PATENTS

| | | | |
|---|---|---|---|
| 3,267,801 | 8/1966 | Abbott, Jr. et al. | 353/24 |
| 3,352,201 | 11/1967 | Brownscombe | 353/24 |
| 3,424,524 | 1/1969 | Akiyama et al. | 353/39 |
| 3,489,494 | 1/1970 | Snider | 353/67 |
| 3,580,660 | 5/1971 | La Russa | 353/99 |
| 3,604,795 | 9/1971 | Crandall | 353/76 |

FOREIGN PATENTS OR APPLICATIONS

| | | | |
|---|---|---|---|
| 1,430,277 | 1/1966 | France | 353/39 |

*Primary Examiner*—Harry N. Haroian
*Assistant Examiner*—Willis Little
*Attorney, Agent, or Firm*—Michael, Best & Friedrich

[57] ABSTRACT

The base of the microfiche reader has a duct at the rear enclosing the fan which delivers cooling air from the forward facing duct at the right of the base. This latter duct receives an optical drawer in which the lamp, heat absorbing glass, condensing lens system, and a first mirror are mounted. The lamp is mounted in a carrier which is adjustable relative to the condensing lens and projection stage to allow the lamp position to be matched to the magnification power of the projection lens which drops in the lens board above the fiche carrier and adjacent the front of the reader for easy focusing access. The upwardly projected image then strikes a second mirror and is reflected back to third and fourth mirrors mounted at 90° to each other for movement fore and aft for varying the projection distance (and, hence, image size) to the screen. The screen can be horizontal or vertical. The third and fourth mirror assembly is moved only one half the effective distance change and this conserves depth of the reader. The fiche carrier supports the fiche between two glass plates in a plane parallel, above, and to one side of the reference grid plane and is provided with a downwardly inclined, pencil-like pointer which can be grasped by the operator for very "natural" selection of the desired grid reference causing corresponding movement of the fiche carrier to position the selected fiche in the projection position.

7 Claims, 8 Drawing Figures

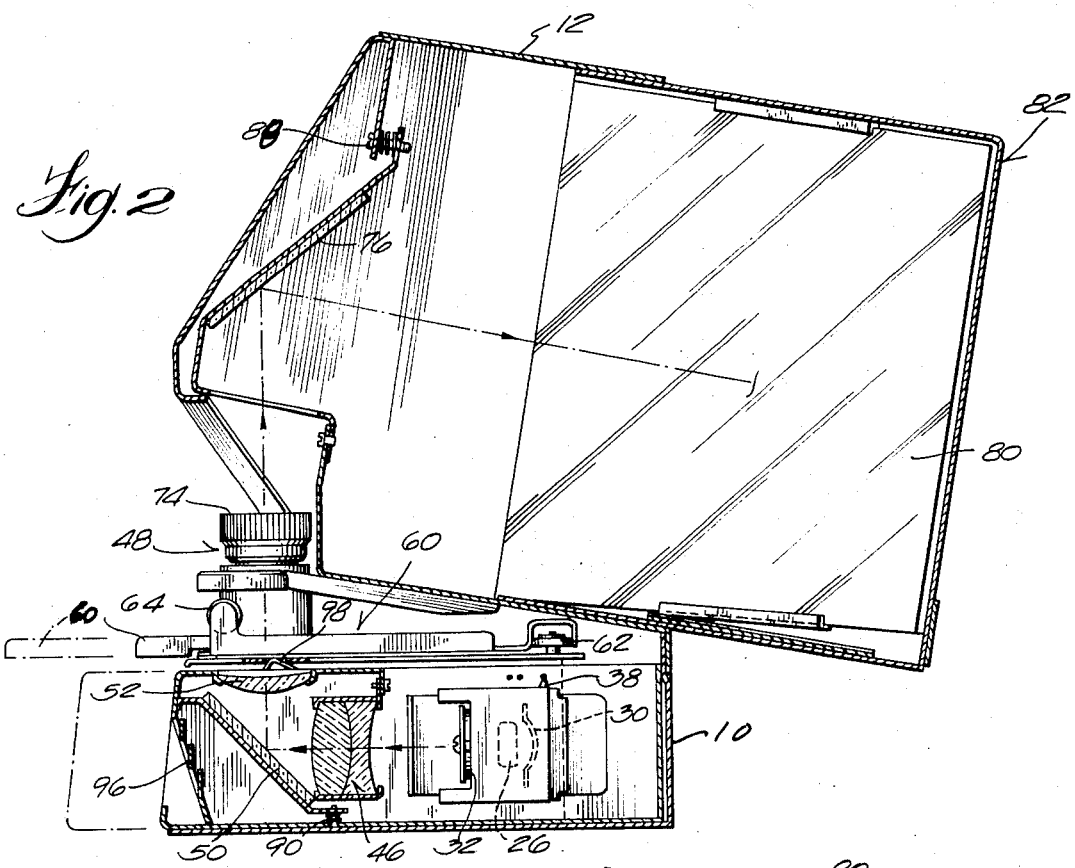
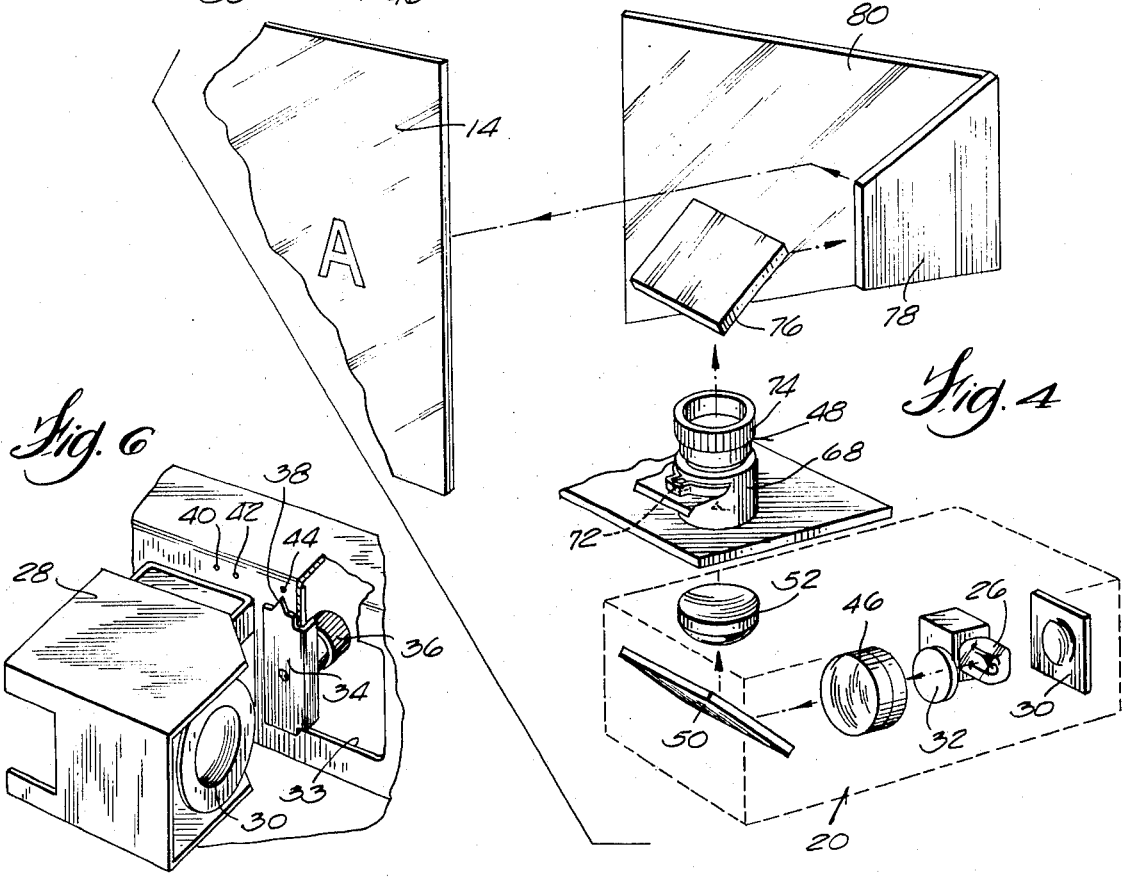

MICROFICHE READER

BACKGROUND OF THE INVENTION

Microfiche readers are gaining uses in many new fields but the equipment has not kept pace with the need for compact readers which can be used on desk tops, etc. The operation is generally somewhat complicated and inconvenient. The optical systems are generally customized and do not permit simple changeover from one magnification to another. The nature of the device has been such as to require considerable special tooling and quite different readers depending upon whether the screen was horizontal or vertical.

SUMMARY OF THE INVENTION

The present design is essentially modular with the same base unit common to either horizontal or vertical screen readers. Thus the screen housing is simply changed to provide the desired screen disposition. This utilizes the base tooling to the fullest. When in use the lens rests on the top glass plate of the carrier and focusing operations do not result in a change in focus when the hand is removed from the lens. The lens is simply "dropped into" an aperture in the lens board and changing lenses is very simple and rapid.

When the lens is changed to give a different magnification there is a requisite change in the optical system. With the present device this is simply effected. The optical drawer is pulled out and the bulb rapidly adjusted on its adjustable mounting. This feature coupled with the adjustable 90° mirror system makes possible an extremely wide range of magnifications and it is easy to "tailor" the unit for the particular needs.

The provision of the fiche carrier on an elevated plane above the optical drawer makes for a compact unit and most importantly makes possible the provision on a depending indicating pointer or stylus which may be grasped like a pencil so the operator moves the pointer to the desired point on the reference grid — which lies in a plane below, offset from, and parallel to the fiche carrier — to cause a corresponding movement of the fiche to properly position the selected image in the projection stage. The ease of this operation is startling.

The foregoing features result in a versatile, compact, and easy to operate unit. The fiche carrier and on-off switch are coupled so movement of the pointer to any place on the grid turns the fan and bulb on while movement of the pointer to the left of the reference grid turns the machine off while the fiche carrier opens to permit removal of the fiche. This guards against the unit being left "on" unnecessarily.

DESCRIPTION OF THE DRAWINGS

FIG. 2 is a sectional view from the right in FIG. 1.

FIG. 4 is a schematic perspective view illustrating the projection system.

FIG. 6 is a detailed perspective showing the manner in which the lamp housing may be adjusted to accommodate changes in the lens system.

DESCRIPTION OF THE PREFERRED EMBODIMENT

Figure 1:
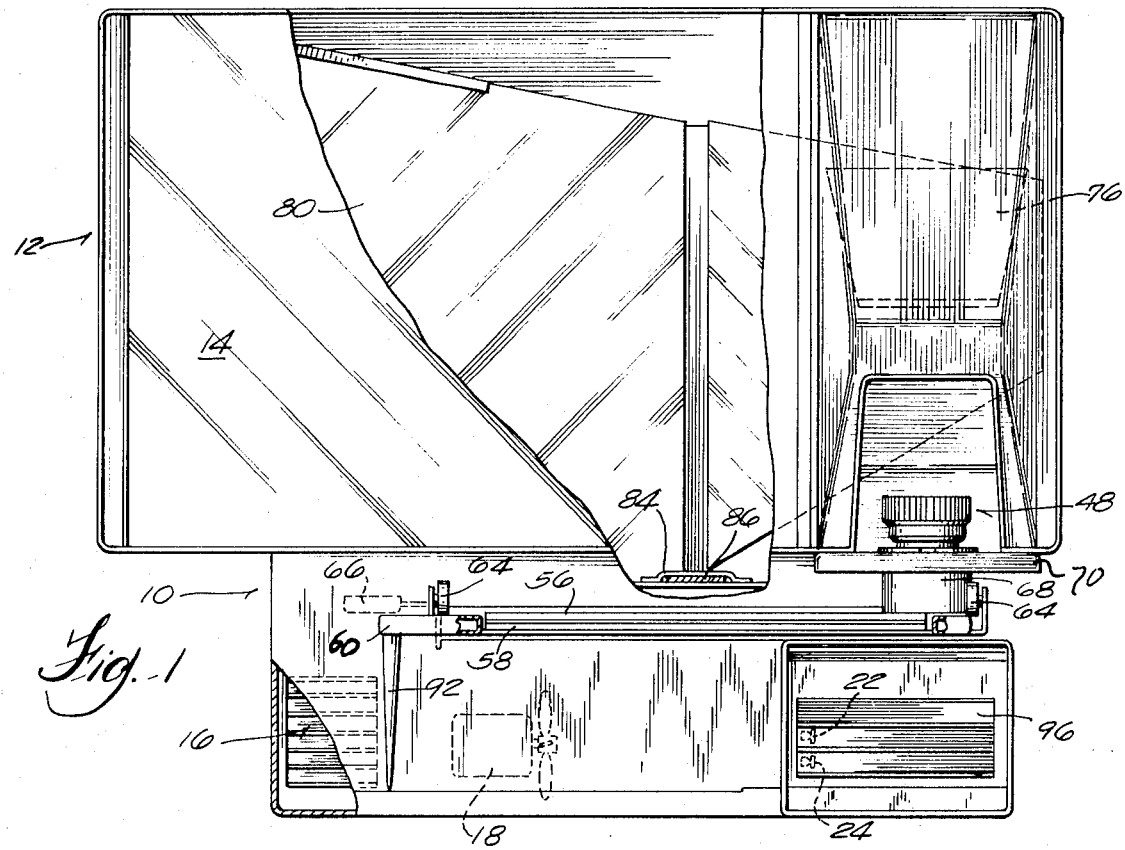
FIG. 1 is a front elevation of the reader with parts broken away for illustration purposes.

Referring to the drawings in detail, the microfiche reader has a base portion 10 upon which the screen housing 12 is mounted. This screen housing can be provided with projection screen 14 having its major axis either vertical or horizontal. (in this case it is horizontal). In either case the base unit remains the same.

At the back of the base unit there is a louver 16 through which air is expelled from the duct running along the back of the base. This duct is provided with a fan 18 drawing air towards the left of the base as viewed in FIG. 1. The air is drawn into the duct on the right-hand side of the base through the louvers 96 on the front of optical drawer 20 which is removably mounted in the duct and readily withdrawn by pulling it forwardly. The drawer has wiper contacts 22,24 which are adapted to engage fixed contacts inside the duct to supply power to lamp 26. The lamp is mounted in lamp housing 28 at the rear of which is mounted reflector 30. At the front of the lamp housing there is heat absorbing glass 32. The lamp housing 28 is guided in aperture 33 in the side of the drawer and movable along the projection axis to allow adjustment of the lamp position. The clamping plate 34 can be drawn up tight against the upper and lower rails of the aperture 33 by tightening the knurled knob 36. The clamping plate 34 is provided with a pointer 38 which is moved into registry with the indicia 40, 42, 44 to properly locate the lamp relative to the condenser lens assembly 46 dependent upon the magnification of the projection lens 48. As will be apparent hereinafter, the projection lens can be changed quite simply to provide different magnification on the screen 14. Any substantial change in the magnification, however, should be accompanied by an adjustment of the lamp housing to assure maximum image brightness on the screen.

Light from the lamp 26 is reflected by the reflector 30 and is projected forwardly through the heat absorbing glass 32 and the condenser lens assembly 46 onto the front surface mirror 50 and then upwardly into the lens 52 immediately below the projection stage. The fiche 54 (transparency) carrying the images to be projected is sandwiched between the upper and lower glass plates 56, 58 of carrier 60. The fiche carrier includes a frame supporting the two glass plates hinged at the rear for movement of the upper plate relative to the lower plate. The carrier is guided on rollers 62, 64 permitting free movement (sideways and fore and aft) in the horizontal plane. In FIG. 1 the carrier is in its extreme left and back position in which it has engaged the switch 66 to cut off the power supply to the fan 18 and lamp 26. When the carrier is moved from this position, either straightforward or towards the right (or combination), the switch is actuated to turn on the fan and the lamp. When the carrier is moved to the full forward position, the rollers and ramps (not shown) bias the upper glass plate 56 upwardly to permit access to the space therebetween to position or remove the fiche.

Figure 7:
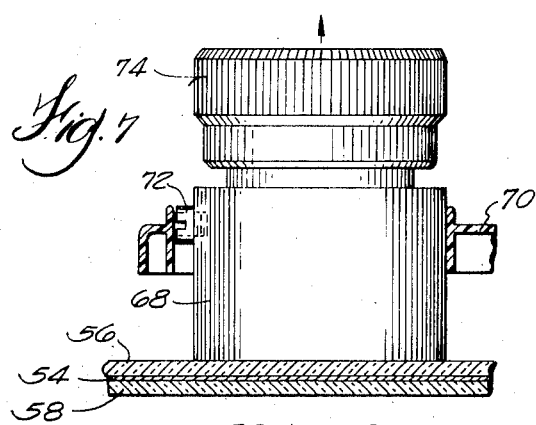
FIG. 7 is a detail view showing the manner in which the projection lens is retained and positioned to rest on the top glass plate of the fiche carrier.
Figure 3:
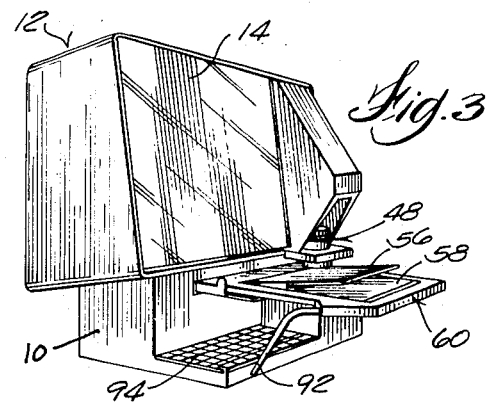
FIG. 3 is a perspective view.
Figure 5:
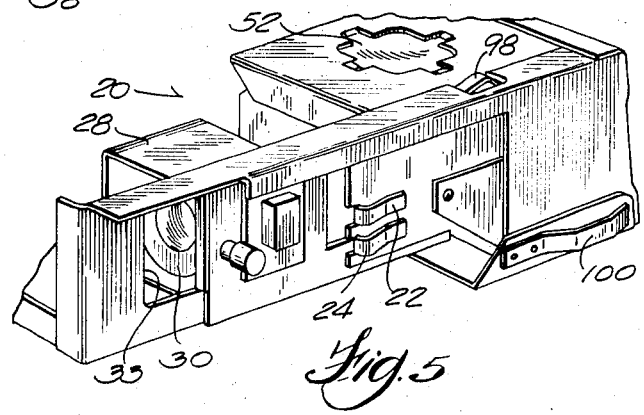
FIG. 5 is a perspective view of the optical drawer removed from the reader.

The projection lens 48 includes a barrel 68 which is received in an aperture in the lens board 70. The barrel is provided with a cap screw or other suitable lug 72 which fits into a vertical slot in the periphery of the aperture in the lens board so as to fix the barrel against rotation but to permit the barrel to move up and down. As shown in FIG. 7, the carrier is closed, that is the plates are sandwiching the fiche 54, and the lens barrel is resting on the top surface of the upper glass plate 56. When the fiche carrier is pulled forward to the position shown in FIG. 3 where the upper plate rises, it will simply lift the lens barrel the necessary distance to permit the upper plate to open. In the projection position with the upper plate in the down position the projection lens barrel rests directly on the plate and, hence, is at a fixed distance from the fiche. The lens assembly is carried by the tube 74 threaded into the lens barrel. The knurled focus ring on tube 74 can be manually rotated to focus the image. As can be seen in FIGS. 2 and 3, the focus ring is readily accessible for manual actuation. Since the lens barrel 68 rests on the upper glass plate, there is no change in the focus when the hand is removed after focusing the image.

Figure 8:
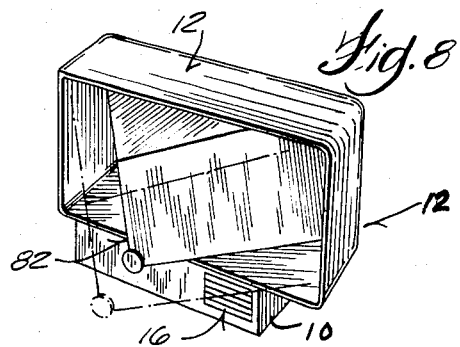
FIG. 8 is a simplified perspective view showing how the 90° mirror assembly (mirrors No. 3 and 4) can be adjusted.

The projected image strikes the front surface second mirror 76 and is then reflected rearwardly onto the front surface third mirror 78 which, in turn, reflects the image horizontally onto the front surface fourth mirror 80 which reflects the image onto the rear projection screen 14. The second mirror 76 is mounted in the housing 12 and adjustable by screws 88. As can be seen particularly in FIG. 8, the housing 12 is open to the rear. The third and fourth mirrors 78, 80 are carried at a fixed 90° angle to each other in a support 82 which telescopes inside the housing 12. The fit of the mirror support 82 in housing 12 is reasonably snug so that the mirror housing is at least partially guided by housing 12. As can be seen in FIG. 1, the lower inside surface of the mirror housing 82 is provided with an inverted channel 84 which functions as a light trap above strap 86 fixed to the housing 12 and supporting a guide channel under housing 12 to restrain motion to fore and aft.

Similar provision for adjustment of the first mirror is effected by screw 90 while the third and fourth mirrors are adjusted at the factory in manufacture.

The fiche carrier is provided with a pointer 92 which is fixed to the carrier and depends downwardly and rearwardly to the left to overlie the reference grid 94 on a plane which is parallel to but below the carrier. The pointer is of adequate length to permit comfortable grasping in the manner of a pencil. As the tip of the pointer is moved to the desired reference point on the grid, the carrier is moved to the corresponding position in which the selected image will lie at the projection stage. There is considerable importance attached to the ease in which this arrangement can be handled. It is far simpler for the operator than operating with grids on the same plane as the carrier as has been the custom in the past. The location on parallel planes spaced a comforatable distance apart is quite important. Locating the fiche carrier to be offset from the grid to insure a clear view of the grid is also important.

A few additional details should be pointed out. The front of the optical drawer is provided with louvers 96 to permit the cooling air to be drawn into the drawer. The drawer is provided with spring members 98, 100 which project into apertures in the duct walls for retention of the drawer in its operative position. In FIG. 2 the spring member 98 can be seen engaging a cooperating aperture in the duct wall.

Should it be desired to have a vertical screen instead of horizontal, this simply requires a change in the housing 12. The vertical screen housing would, of course, have differently shaped second, third, and fourth mirrors to accommodate the different disposition of the image. However, the base unit remains the same. In either case it will be noted that the mirror housing 82 is adjusted fore and aft a distance which is but one half of the effective increase in projection distance. That is accomplished simply by having the third and fourth mirrors movable as a unit. This results in a substantial reduction in the requisite depth for use of the machine.

From the foregoing it will be appreciated that this machine is quite versatile and can be readily adjusted to achieve substantial variations in magnification. The primary change in magnification, of course, is made by changing the projection lens itself. This requires a change in the lamp location which is very simply effected by removing the drawer, loosening the knurled knob 36, and moving the lamp housing to the requisite position as indicated by pointer 38 whereupon the knob is tightened to lock the lamp housing in its new position matched to the projection lens in use. Relatively minor changes in the magnification are, of course, achieved by moving the mirror housing 82 fore and aft, which has the effect of changing the distance to the screen 14. This is a zoom effect and makes it possible to "tailor" the size of the image exactly. It is felt that the design of the base results in a very efficient use of space and additionally makes possible the highly desirable location of the reference grid relative to the fiche carrier.

I claim:

1. A microfiche reader comprising a base including an optical system projecting light forwardly along one side of the base onto a first mirror which reflects the light upwardly, a fiche carrier mounted on an upper portion of the base for movement in a first direction normal to the reflected light and parallel to the plane of the base and in a second direction transverse thereto and positioned above said optical system, said carrier including upper and lower glass plates between which a fiche is sandwiched, a lens including a lens barrel fixed against rotation but free to rest on the upper glass plate and a lens assembly threadably mounted in the barrel for focusing movement, said lens being positioned above the first mirror to project an image upwardly, a second mirror reflecting the image rearwardly, a third mirror reflecting the image from the second mirror laterally, a fourth mirror reflecting the image from the third mirror forwardly, the third and fourth mirrors being fixed at 90° to each other, a rear projection screen having a surface upon which the image from the fourth mirror is focused, a reference grid surface positioned on a lower portion of the base below and laterally disposed relative to said optical system and substantially below and parallel to said carrier, and a pointer mounted on said carrier and depending therefrom to overlie said reference grid so that positioning said pointer over selected coordinates on said reference grid will position the corresponding portion of the fiche in said carrier, the length of said depending pointer being substantially equal to the vertical spacing between the carrier and grid, whereby the pointer can be grasped comfortably while the carrier is free to move into overlapping relationship relative to the grid.

2. A microfiche reader according to claim 1 in which the reference grid is offset to one side of the carrier when the carrier is in operative position, said pointer being inclined to one side and downwardly and rearwardly as the reader is viewed from the operator's position to assume the attitude of a writing instrument.

3. A microfiche reader according to claim 2 including a drawer slidably mounted in the base from the front and containing said optical system and first mirror and in which the base includes an air delivery duct along the rear of the base leading to the rear portion of the drawer, the drawer being provided with louvers at the front to allow air to move from the front to the back of the drawer, said grid being located on generally the same plane as the bottom of the duct and the grid being located forwardly of the duct and to one side of the drawer.

4. A microfiche reader according to claim 1 including a housing mounted on the base and supporting said screen, said third and fourth mirros being mounted in a carrier which encloses the third and fourth mirrors and is mounted in said housing for telescopic movement in the housing towards and from the screen whereby the third and fourth mirrors move as a unit and increase the effective projection distance twice the distance the carrier is moved.

5. A microfiche reader according to claim 1 in which the lens is freely accessible for manual focusing and may be removed simply by lifting it vertically for replacement by a lens of different magnification, the optical system in the base being fixed in a drawer which can be removed as a unit, said system including a lamp and lamp housing adjustably mounted in the drawer to permit adjustment of the lamp to proper position for maximum results with the projection lens in use, said base including fixed electrical contacts and said drawer including contacts positioned to engage the fixed contacts when the drawer is in position in the base, the contacts carried by the drawer being connected to the lamp.

6. A microfiche reader including an optical system for projecting an image onto a rear projection screen, said optical system including a light source and a mirror at the bottom and one side of the reader to project light upwardly to a projection stage, a fiche carrier movable in a horizontal plane to position a portion thereof in the projection stage in accordance with coordinates, a reference grid of coordinates located in a plane parallel to the carrier and vertically spaced downwardly of the carrier to one side of said light source and mirror, the grid being at the bottom of the reader, a pointer depending from the carrier and having a length to overlie the grid so movement of the pointer to selected coordinates on the grid will properly position the fiche at the projection stage with the carrier free to overlie at least a portion of the grid, the length of said depending pointer being substantially equal to the vertical spacing between the carrier and grid, whereby the pointer can be comfortably grasped with the hand of a using lying below the plane of the carrier.

7. A microfiche reader comprising a cabinet having an optical system projecting light through a film plane into a projection lens, said cabinet including a front portion and a rear portion telescopically mounted on the rear of the front portion, said projection lens directing the light into a mirror system including two mirrors positioned at 90° to each other in the said rear portion of the cabinet, the reflected image from the second of the mirrors being projected in a path perpendicular to a rear projection screen in the front of said front portion, the telescopic mounting of said rear portion permitting movement of both mirrors as a unit in a precise path toward and from the screen whereby the effective light path from the film plane to the screen is decreased or increased twice the distance the mirrors are moved relative to said screen.

* * * * *